(12) United States Patent
Lumezanu et al.

(10) Patent No.: US 9,654,372 B2
(45) Date of Patent: May 16, 2017

(54) PATENT LATENCY MONITORING IN SOFTWARE-DEFINED NETWORKS

(71) Applicant: NEC Laboratories America, Inc., Princeton, NJ (US)

(72) Inventors: Cristian Lumezanu, East Windsor, NJ (US); Curtis Yu, San Gabriel, CA (US); Abhishek Sharma, New Brunswick, NJ (US); Guofei Jiang, Princeton, NJ (US); Qiang Xu, East Windsor, NJ (US)

(73) Assignee: NEC Corporation, Tokyo (JP)

( * ) Notice: Subject to any disclaimer, the term of this patent is extended or adjusted under 35 U.S.C. 154(b) by 421 days.

(21) Appl. No.: 14/300,843

(22) Filed: Jun. 10, 2014

(65) Prior Publication Data

US 2015/0071108 A1 Mar. 12, 2015

Related U.S. Application Data

(60) Provisional application No. 61/874,424, filed on Sep. 6, 2013.

(51) Int. Cl.
*H04L 12/26* (2006.01)

(52) U.S. Cl.
CPC ........ *H04L 43/106* (2013.01); *H04L 43/0852* (2013.01)

(58) Field of Classification Search
CPC .. H04L 43/106; H04L 43/0852; H04L 43/062
See application file for complete search history.

(56) References Cited

U.S. PATENT DOCUMENTS

2013/0010600 A1 1/2013 Jocha et al.
2013/0191530 A1 7/2013 Zhang et al.

FOREIGN PATENT DOCUMENTS

JP WO 2012077259 A1 * 6/2012 ............. H04L 47/12

OTHER PUBLICATIONS

Duffield, N.G., et al. "Trajectory Sampling for Direct Traffic Observation" IEEE/ACM Transactions on Networking, vol. 9, No. 3. Jun. 2001. pp. 280-292.

(Continued)

*Primary Examiner* — Feben M Haile
(74) *Attorney, Agent, or Firm* — Joseph Kolodka

(57) ABSTRACT

In a software defined network having switches including first and last switches and intermediate switches, wherein a default routing path exists between the first and last switches, a system and method are provided for computing path latency. The method includes inserting a respective monitoring rule(s) in each switch, mandating for each switch, forwarding a received rule matching packet to a next switch, and further mandating for the first switch and the last switch, sending a PacketIn message to a controller. The method includes inserting, in each switch, a respective monitoring probe(s) matching the respective monitoring rule(s) in a same switch to initiate mandates specified by the respective monitoring rule(s) in the same switch responsive to an arrival of the packet thereat. The method includes time-stamping the PacketIn messages to generate PacketIn timestamps, aggregating the PacketIn timestamps, and estimating the path latency from an aggregation of PacketIn timestamps.

9 Claims, 4 Drawing Sheets

(56) References Cited

OTHER PUBLICATIONS

Kompella, R., et al. "Every Microsecond Counts: Tracking Fine-Grain Latencies With a Lossy Difference Aggregator" SIGCOMM'09. Aug. 2009. (12 Pages).
Lee, M., et al. "Not All Microseconds are Equal: Fine-Grained Per-Flow Measurements With Reference Latency Interpolation" SIGCOMM'10. Aug. 2010. (12 Pages).

* cited by examiner

PATENT LATENCY MONITORING IN SOFTWARE-DEFINED NETWORKS

RELATED APPLICATION INFORMATION

This application claims priority to provisional application Ser. No. 61/874,424 filed on Sep. 6, 2013, incorporated herein by reference.

BACKGROUND

Technical Field

The present invention relates to networks, and more particularly to path latency monitoring in software-defined networks.

Description of the Related Art

Network latency contributes to the performance of many data center applications such as search, e-commerce, and banking Such applications often have several distributed components that need to communicate across low-latency network paths to reduce user response time and maximize provider revenue. To effectively manage the data center network and provide low-latency paths to applications, operators must continually monitor the latency on all paths and quickly route the traffic away from paths with high delay.

To monitor the network paths latency, data center operators have two perspectives: from the application; and from the network. A simple and common approach is to send probes (e.g., ping) between application servers and measure their response time. Many data center operators are reluctant to repeatedly run expensive measurements from end-hosts and prefer to allocate resources to customer Virtual Machines (VMs). In addition, some data centers, such as collocation centers, restrict operator access to customer servers. The alternative is to monitor the latency from the network. However, all of the conventional solutions require expensive instrumentation and coordination to capture and processes latency measurements.

SUMMARY

These and other drawbacks and disadvantages of the prior art are addressed by the present principles, which are directed to path latency monitoring in software-defined networks.

According to an aspect of the present principles, in a software defined network having switches including a first switch, a last switch, and intermediate switches there between, wherein a default routing path exists between the first switch and the last switch, a method is provided for computing path latency of the default routing path. The method includes inserting at least one respective flow monitoring rule in each of the switches, mandating for each of the switches, forwarding a received rule matching packet to a next switch on the path, and further mandating for the first switch and the last switch, sending a PacketIn message to a controller connected to the software defined network. The method further includes inserting, in each of the switches, at least one respective flow monitoring probe matching the at least one respective flow monitoring rule in a same one the switches to initiate mandates specified by the at least one respective flow monitoring rule in the same one of the switches responsive to an arrival of the received rule matching packet thereat. The method additionally includes time-stamping the PacketIn messages to generate PacketIn timestamps. The method also includes aggregating the PacketIn timestamps to obtain an aggregation of PacketIn timestamps. The method further includes estimating, using a processor, the path latency from the aggregation of PacketIn timestamps.

According to another aspect of the present principles, in a software defined network having switches including a first switch, a last switch, and intermediate switches there between, wherein a default routing path exists between the first switch and the last switch, a system is provided for computing path latency of the default routing path. The system includes a rule generator for inserting at least one respective flow monitoring rule in each of the switches, mandating for each of the switches, forwarding a received rule matching packet to a next switch on the path, and further mandating for the first switch and the last switch, sending a PacketIn message to a controller connected to the software defined network. The system further includes a probe generator for inserting, in each of the switches, at least one respective flow monitoring probe matching the at least one respective flow monitoring rule in a same one the switches to initiate mandates specified by the at least one respective flow monitoring rule in the same one of the switches responsive to an arrival of the received rule matching packet thereat. The system additionally includes a traffic listener for time-stamping the PacketIn messages to generate PacketIn timestamps. The system also includes a latency estimator for aggregating the PacketIn timestamps to obtain an aggregation of PacketIn timestamps, and estimating the path latency from the aggregation of PacketIn timestamps.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

In various embodiments of the present principles, the present principles use software-defined networking (SDN) to estimate the latency of a network path. SDN separates the control and data planes of a network and provides an open communication interface between them. Most of the network control functionality is outsourced from switches and delegated to a centralized server (the controller), whereas switches focus only on forwarding packets. The controller and switches communicate with each other using a specialized protocol such as, for example, OpenFlow. With OpenFlow, switches have the ability to asynchronously notify the controller of network events (e.g., when a new flow arrives and there are no matching entries for it in the flow table or when the match action indicates it specifically).

We estimate the latency of a network path by comparing the timestamps of PacketIn messages sent by switches at the ends of the path and associated with each packet. A switch sends PacketIn when it does not find a match for the current packet or when specifically instructed, as an action in a rule. By correlating the timestamps associated with PacketIns that are triggered by the same packet, we can track the trajectory of that packet across the network and its latency.

A preliminary solution was proposed that is limited to working with reactive OpenFlow deployments, where operators do not install forwarding rules a priori. Estimating latency from PacketIn messages with this preliminary solution in non-reactive (i.e., proactive) deployments, where rules are installed a priori, is more difficult because there is little control traffic. In accordance with the present principles, we propose a monitoring framework that, given a path for which to monitor latency, installs specific forwarding rules on each switch on this path and then generates a series of probe messages that match these rules. The rules on the first and last switch of the path have two, rather than one action: in addition to forwarding matching packets to the next switch on the path, the rules also send a PacketIn message to the controller. The controller timestamps the PacketIn messages from the first and last switch on the path and estimates the path latency as the difference between the timestamps.

Figure 1:
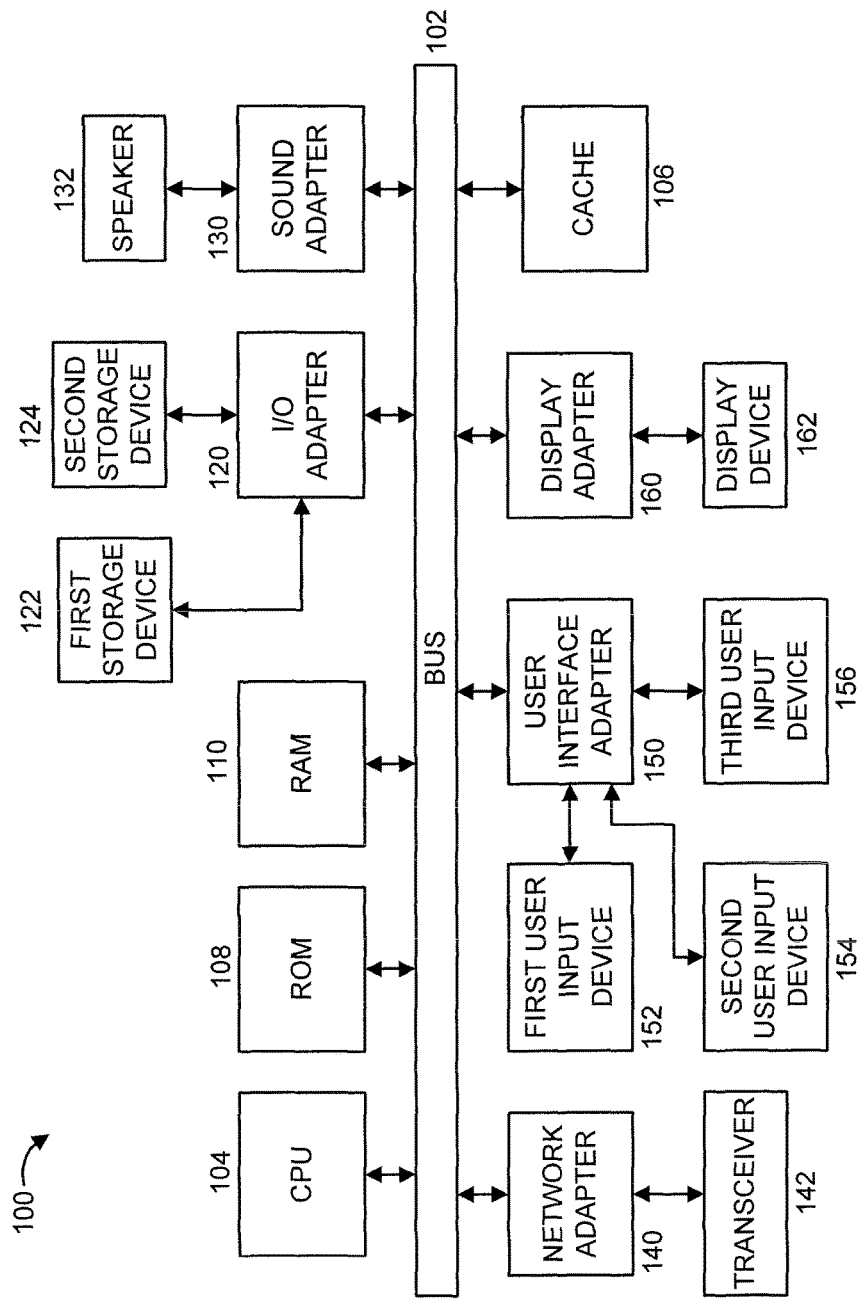
FIG. 1 shows an exemplary processing system 100 to which the present principles may be applied, according to an embodiment of the present principles.

Referring now in detail to the figures in which like numerals represent the same or similar elements and initially to FIG. 1, a block diagram illustrating an exemplary processing system 100 to which the present principles may be applied, according to an embodiment of the present principles, is shown. The processing system 100 includes at least one processor (CPU) 104 operatively coupled to other components via a system bus 102. A cache 106, a Read Only Memory (ROM) 108, a Random Access Memory (RAM) 110, an input/output (I/O) adapter 120, a sound adapter 130, a network adapter 140, a user interface adapter 150, and a display adapter 160, are operatively coupled to the system bus 102.

A first storage device 122 and a second storage device 124 are operatively coupled to system bus 102 by the I/O adapter 120. The storage devices 122 and 124 can be any of a disk storage device (e.g., a magnetic or optical disk storage device), a solid state magnetic device, and so forth. The storage devices 122 and 124 can be the same type of storage device or different types of storage devices.

A speaker 132 is operative coupled to system bus 102 by the sound adapter 130. A transceiver 142 is operatively coupled to system bus 102 by network adapter 140. A display device 162 is operatively coupled to system bus 102 by display adapter 160.

A first user input device 152, a second user input device 154, and a third user input device 156 are operatively coupled to system bus 102 by user interface adapter 150. The user input devices 152, 154, and 156 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present principles. The user input devices 152, 154, and 156 can be the same type of user input device or different types of user input devices. The user input devices 152, 154, and 156 are used to input and output information to and from system 100.

Of course, the processing system 100 may also include other elements (not shown), as readily contemplated by one of skill in the art, as well as omit certain elements. For example, various other input devices and/or output devices can be included in processing system 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 100 are readily contemplated by one of ordinary skill in the art given the teachings of the present principles provided herein.

In it envisioned that some form of processing system 100 is representative of some of the elements in network to which the present principles can be applied.

Figure 2:
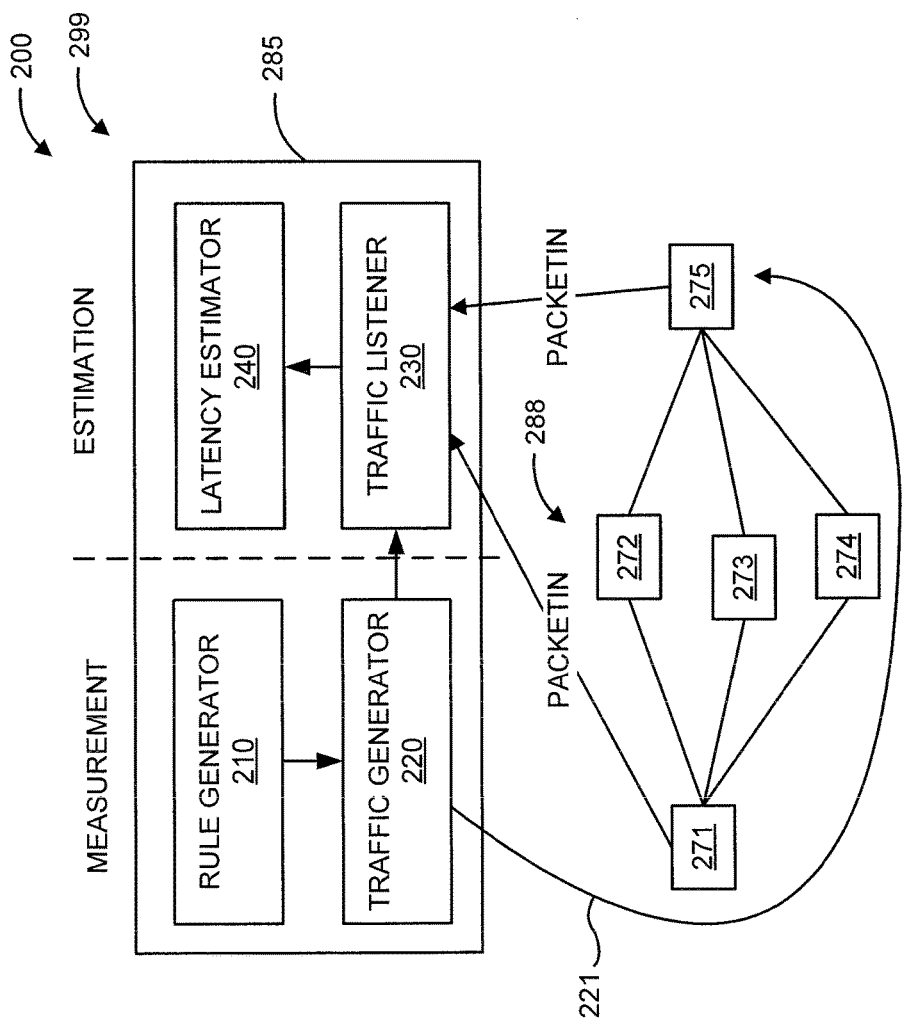
FIG. 2 shows an exemplary system 200 for path latency monitoring in software defined networks, in accordance with an embodiment of the present principles.

Moreover, it is to be appreciated that system 200 described below with respect to FIG. 2 is a system for implementing respective embodiments of the present principles. Part or all of processing system 100 may be implemented in one or more of the elements of system 200.

Figure 3:
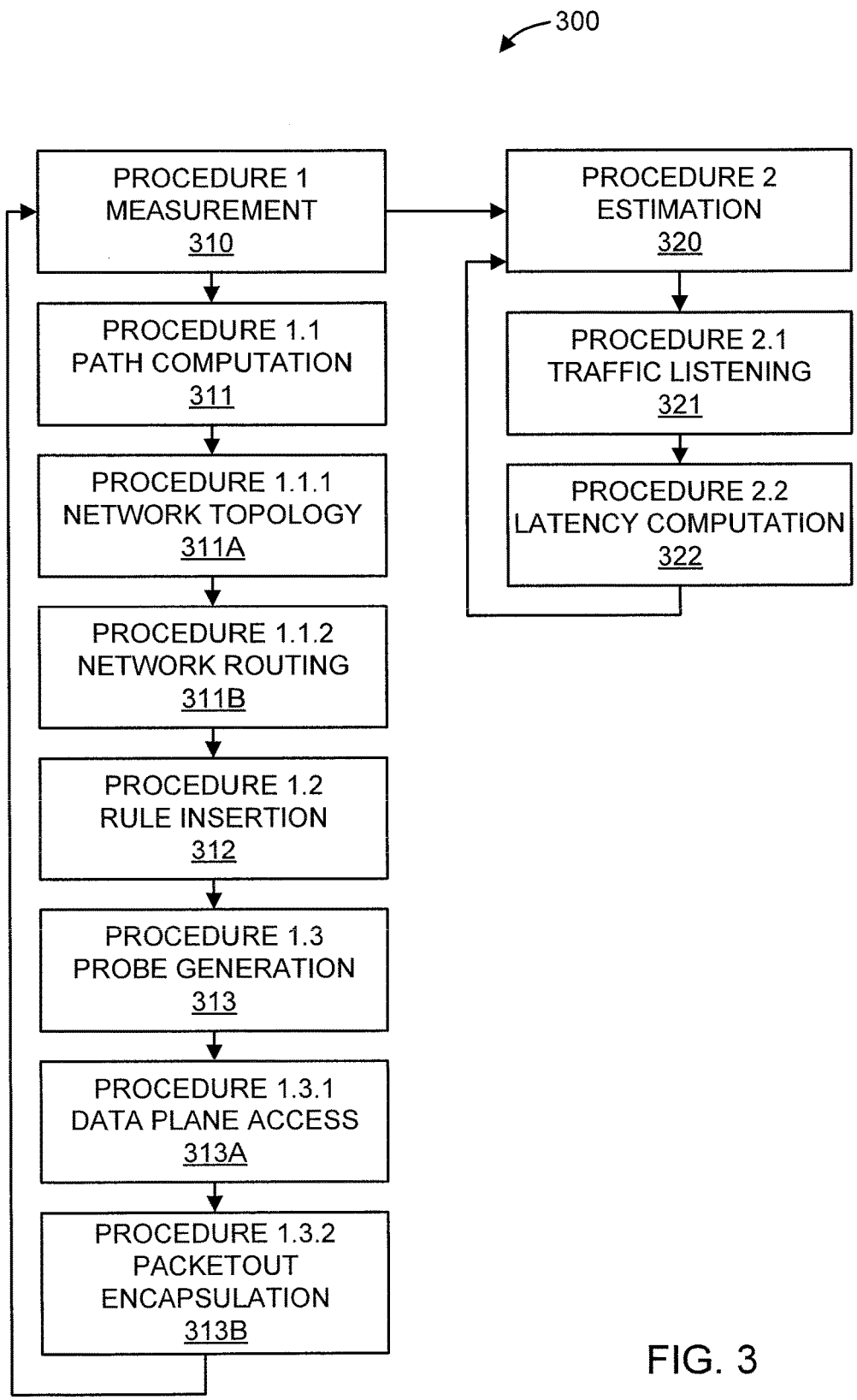
FIG. 3 shows an exemplary method 300 for path latency monitoring in software defined networks, in accordance with an embodiment of the present principles.

Further, it is to be appreciated that processing system 100 may perform at least part of the method described herein including, for example, at least part of method 300 of FIG. 3. Similarly, part or all of system 200 may be used to perform at least part of method 300 of FIG. 3.

FIG. 2 shows an exemplary system 200 for path latency monitoring in software defined networks, in accordance with an embodiment of the present principles. The architecture of system 200 includes the following four primary elements: (1) a rule generator 210; (2) a traffic generator (also interchangeably referred to herein as a probe generator) 220; (3) a traffic listener 230; and (4) a latency estimator 240. The system 200 is implemented in a software defined network 299. The network 299 includes a set of switches 288. The switches 288 include a first switch 271, a last switch 275, and intermediate switches 272, 273, and 274 there between. A path 266 is defined between the first switch 271 and the last switch 275. The system 200 receives as input the pair of switches 271 and 275 and computes the distribution of latency on the default routing path 266 between the switches 271 and 275 over a predetermined period of time.

A centralized controller (hereinafter "controller" in short) 285 is also used. In the embodiment of FIG. 2, the controller 285 includes the rule generator 210, the traffic generator 220, the traffic listener 230, and the latency estimator 240. In other embodiments, the controller 285 can be separate from these elements or be included in one or some of these elements. The controller 285 can be implemented in a centralized configuration or some other configuration, as readily contemplated by one of ordinary skill in the art given the teachings of the present principles provided herein. In the embodiment of FIG. 2, the controller includes a processor and memory (shown in FIG. 1). In other embodiments, one or more of the elements of the controller 285 can include their own processor and memory, or can share one or more processors and memories, and/or so forth. These and other variations of the system 200 of FIG. 2 are readily contemplated by one of ordinary skill in the art given the teachings of the present principles provided herein, while maintaining the spirit of the present principles. We further describe each system component below.

The rule generator 210 reads the forwarding rules from each switch 271 through 275 in the network and determines the routing path between the two switches 271 and 275 specified as input. This is the path 266 whose latency the system 200 computes. Then, for each switch 271 through 275 on the path, the rule generator 210 installs a very specific forwarding rule, such that no existing traffic matches against it The traffic generator 220 generates probes 221 that match the specific rules installed by the rule generator 210.

The traffic listener 230 captures PacketIn control messages and their timestamps.

The latency estimator 240 collects PacketIn timestamps from the traffic listener 230 and attempts to correlate them with the data packets that triggered them.

FIG. 3 shows an exemplary method 300 for path latency monitoring in software defined networks, in accordance with an embodiment of the present principles. The method involves a first procedure (namely, measurement) and a second procedure (namely, estimation). Accordingly, the figure reference numeral 310 interchangeably refers to both the first procedure and its alias measurement. Further, the figure reference numeral 320 interchangeably refers to both the second procedure and its alias estimation.

Regarding measurement 310, the same involves sub-procedures path computation 311, rule insertion 312, and probe generation 313. Regarding estimation 320, the same involves sub-procedures traffic listening 321 and latency computation 322.

A description will now be given regarding measurement 310, in accordance with an embodiment of the present principles.

The measurement procedure 310 inserts monitoring probes 221 on the path to be monitored. The goal of the monitoring probes 221 is to trigger PacketIn messages at switches on the path 266. By time-stamping the PacketIn messages at the controller 285 and aggregating the timestamps, we estimate the latency between arbitrary switches (e.g., switches 271 and 275). The measurement procedure 310 includes the above mentioned three sub-procedures as in further detailed as follows: computing the network path between two arbitrary points (e.g., switches 271 and 272) in the network (sub-procedure 311, path computation); inserting monitoring rules at switches 273, 274, and 275 along this path (sub-procedure 312, rule insertion); and generating probe packets that generate these monitoring rules (sub-procedure 313, probe generation).

A description will now be given regarding path computation 311, in accordance with an embodiment of the present principles.

Path computation 311 infers the sequence of network switches 272, 273, and 274 between two arbitrary "points" (e.g., switches 271 and 275) in the network 299. The network "points" can be end-points (e.g., servers) or network switches. For end-points, path computation 311 first infers the switches where they connect to the network 299 and computes the path 266 between these edge switches 271 and 275.

Computing the path between two switches 271 and 275 requires information about the network topology and routing.

A description will now be given regarding a procedure to compute network topology, in accordance with an embodiment of the present principles.

We infer the network topology by sending Link Layer Discovery Protocol (LLDP) packets (specified in standards document IEEE 802.1AB) from each switch (to infer links between switches) and by examining OpenFlow rules installed on each switch (to infer to which switch is an endpoint connected). The key step here is detecting where on the network is an endpoint collected. We start with a switch that has a rule matching the endpoint IP (as a destination) and proceed in several ways.

(A) If the action of the rule is to forward to an out port, then we follow the corresponding link. If the link is present in the topology, then we select the destination switch of the link and repeat the process. If the link is not present in the topology, then we conclude it leads to the endpoint and infer that the endpoint is connected to the current switch.

(B) If the action of the rule is other than forward to an outport, we select another switch in the topology that has a rule that matches the endpoint IP as a destination.

A description will now be given regarding computing network routing, in accordance with an embodiment of the present principles.

To identify potential paths between two arbitrary switches 271 and 275, we poll each network switch and request the forwarding rules installed in the flow tables. We consider all possible paths that carry traffic from the two arbitrary "network" points. If we have application information (e.g., we want to monitor the path taken by a specific application), then we can further refine the set of possible paths by accounting for source and destination IP addresses and port numbers.

A description will now be given regarding rule insertion 312, in accordance with an embodiment of the present principles.

Rule insertion 312 inserts monitoring rules on the path 266 to be monitored. A monitoring rule should have two important characteristics: be specific; and be non-intrusive. First, the rule should cover a specific part of the flow space not covered by the collection of rules already in the flow table. If this is not possible (i.e., the rules in the flow table cover all possible flows), then the monitoring rule should be more specific than any other rule existing on the switch and which covers the same part. One way to ensure that a rule is as specific as possible is to not include any wildcards in its match fields. Second, each monitoring rule should forward traffic to the next switch on the path (i.e., should not change the routing of the network). The only exception comes for the rules installed on the first switch 271 and the last switch 275 on the path 266, which should also send a copy of the matching packets to the controller 285 encapsulated in a PacketIn message. This is possible by adding two actions to the rule (e.g., "send to outport" and "send to controller").

A description will now be given regarding probe generation 313, in accordance with an embodiment of the present principles.

This procedure generates probes 221 that match the specific monitoring rules inserted by rule insertion 312. Each probe triggers PacketIn messages at the first switch 271 and last switch 275 on the path. The operator uses the timestamps of the PacketIn messages to estimate the latency between the switches at the controller 285 and without the need for distributed coordination across the network. The operator can vary the arrival distribution, rate, and size of probes 221. To insert the probes 221 on the data path, we have two equivalent options.

A description will now be given regarding a procedure that is part of probe generation 313, namely data plane access 313A, in accordance with an embodiment of the present principles.

If the controller 285 is connected to the data path, we simply use the interface connected to the data plane to send the probes 221; this has the advantage that sending probes 221 requires less switch processing, because we directly access the data plane, but probes 221 may traverse additional parts of the network, when the first switch 271 on the monitored path is not connected to the controller 285 on the data plane.

A description will now be given regarding another procedure that is part of probe generation 313, namely PacketOut encapsulation 313B, in accordance with an embodiment of the present principles.

If the controller 285 is not connected to the data plane, then it encapsulates each probe in a PacketOut OpenFlow message and asks the first switch 271 in the monitored path to send it. PacketOut encapsulation 313B incurs additional switch processing in translating a packet from the switch control plane to the data plane but does not require sending traffic through switches that are not on the monitored path, thus not incurring additional network utilization.

A description will now be given regarding estimation 320, in accordance with an embodiment of the present principles.

Estimation 320 estimates the latency between two network switches 271 and 275 based on the timestamps of PacketIn messages that these switches 271 and 275 trigger for the same data packet. Estimation includes a method to capture control packets (namely, traffic listening 321) and to aggregate their timestamps and generate a latency distribution for the path (namely, latency computation 322).

A description will now be given regarding traffic listening 321, in accordance with an embodiment of the present principles.

Traffic listening 321 captures control traffic sent by switches to the controller 285. Each control packet receives a timestamp at the time of capture. Traffic listening 321 filters out all messages except PacketIn. Traffic listening 321 then associates each PacketIn message with the data packet that triggered it. This is facilitated by the fact that PacketIn messages usually encapsulate at least the header of the data packet that generated them.

A description will now be given regarding latency computation 322, in accordance with an embodiment of the present principles.

The latency computation 322 receives a stream of tuples (packetID, switchID, timestamp). The packetID uniquely identifies each data packet (e.g., the packetID can be the Internet Protocol ID (IPID) or Internet Control Message Protocol (ICMP) ID or a hash of packet contents). The switchID is the ID of the switch that sent the PacketIn. In the stream of tuples received from the traffic listening module, a single packet id should appear as many times as there are switches that trigger PacketIn on the packet's path. To compute the latency between two switches, we simply subtract the timestamps associated with their switch IDs and with a unique packet ID. If the timestamp of the PacketIn from the last switch is before that of the PacketIn from the first switch, we discard the measurement.

The latency computation procedure 322 described above presumes that the latency between the controller 285 and the first and last switch on the path is the same. In reality, this may not be the case and PacketIn messages from different switches can take different amounts of time to get to the controller 285. We continuously monitor the control channel latency to each switch by periodically sending EchoRequest OpenFlow messages and measuring the time it takes for the EchoReply to return. If we notice that there is a difference in latency between the control channels to the first and last switch, we adjust the estimated latency with the difference in control channel latencies.

While essentially the entirety of method 300 differs from the prior art, rule insertion 312, probe generation 313, and latency computation 322 are particularly different than the prior art for quite a number of reasons. We note that these procedures 312, 313, and 332 measure the latency distribution between two arbitrary network "points" (servers or switches) in an OpenFlow network. Existing methods can monitor latency from the servers (e.g., ICMP requests) but are limited when access to servers is restricted to operators (e.g., in collocation centers) or restricted (e.g., when most server resources are allocated to Virtual Machines (VMs)). Network-based techniques (e.g., that do not require access to end-hosts) exist, but require coordination across the network (in that, the operator must correlate NetFlow information captured by different switches), which is difficult, and in the cases of Reference Latency Interpolation (RLI) or Lossy Difference Aggregator (LDA), requires modifying the switch architecture. The solution provided by the present principles requires only local coordination (at the controller 285) and no changes to network devices.

Figure 4:
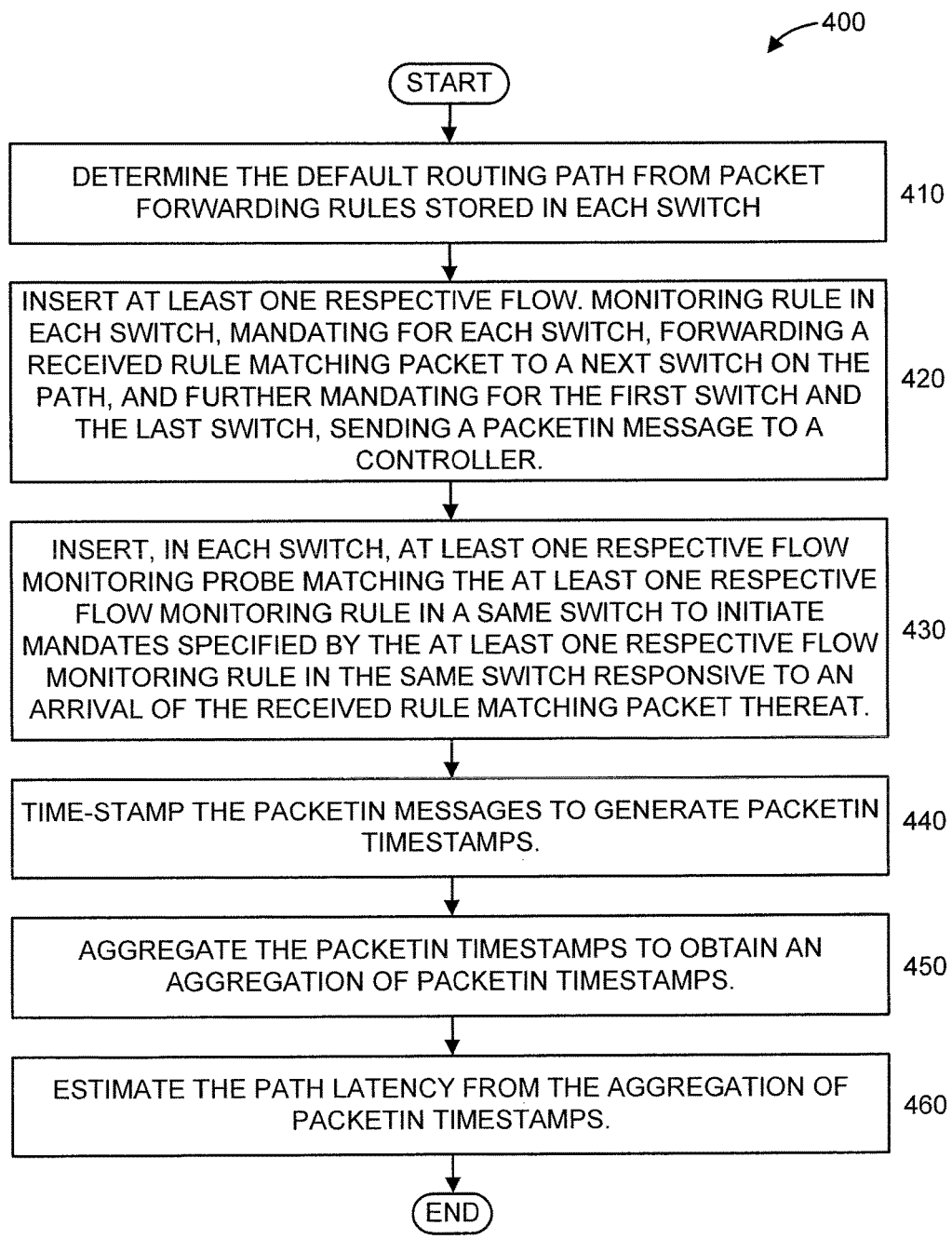
FIG. 4 shows another exemplary method 400 computing path latency of a default routing path in a software defined network, in accordance with an embodiment of the present principles.

FIG. 4 shows another exemplary method 400 computing path latency of a default routing path in a software defined network, in accordance with an embodiment of the present principles. The software defined network 299 has switches 271 through 275 including a first switch 271, a last switch 275, and intermediate switches 272, 273, and 274 there between. A default routing path 266 exists between the first switch 271 and the last switch 275. Method 400 is based on method 300, but shows additional details in the depicted flowchart.

At step 410, the rule generator 210 determines the default routing path from packet forwarding rules stored in each switch.

At step 420, the rule generator 210 inserts at least one respective flow monitoring rule in each switch, mandating for each switch, forwarding a received rule matching packet to a next switch on the path, and further mandating for the first switch and the last switch, sending a PacketIn message to a controller;

At step 430, the probe generator inserts, in each switch, at least one respective flow monitoring probe matching the at least one respective flow monitoring rule in a same switch to initiate mandates specified by the at least one respective flow monitoring rule in the same switch responsive to an arrival of the received rule matching packet thereat At step 440, the traffic listener 230 time-stamps the PacketIn messages to generate PacketIn timestamps.

At step 450, the latency estimator 240 aggregates the PacketIn timestamps to obtain an aggregation of PacketIn timestamps.

At step 460, the latency estimator 240 estimates the path latency from the aggregation of PacketIn timestamps.

Embodiments described herein may be entirely hardware, entirely software or including both hardware and software elements. In a preferred embodiment, the present invention is implemented in software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable medium such as a semiconductor or solid state memory, magnetic tape, a removable computer diskette, a random access memory (RAM), a read-only memory (ROM), a rigid magnetic disk and an optical disk, etc.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope and spirit of the invention as outlined by the appended claims.

Having thus described aspects of the invention, with the details and particularity required by the patent laws, what is claimed and desired protected by Letters Patent is set forth in the appended claims.

What is claimed is:

1. In a software defined network having switches including a first switch, a last switch, and intermediate switches there between, a default routing path existing between the first switch and the last switch, a system for computing path latency of the default routing path, the system comprising:
    a rule generator for inserting at least one respective flow monitoring rule in each of the switches, mandating for each of the switches, forwarding a received rule matching packet to a next switch on the path, and further mandating for the first switch and the last switch, sending a PacketIn message to a controller connected to the software defined network;
    a probe generator for inserting, in each of the switches, at least one respective flow monitoring probe matching the at least one respective flow monitoring rule in a same one the switches to initiate mandates specified by the at least one respective flow monitoring rule in the same one of the switches responsive to an arrival of the received rule matching packet thereat;
    a traffic listener for time-stamping the PacketIn messages to generate PacketIn timestamps; and
    a latency estimator for aggregating the PacketIn timestamps to obtain an aggregation of PacketIn timestamps, and estimating the path latency from the aggregation of PacketIn timestamps;
    wherein the latency estimator sends EchoRequest OpenFlow messages from the controller, measures respective return times of the EchoRequest OpenFlow messages, and adjusts the estimated path latency responsive to different control channel latencies determined from the respective measured return times, the controller being connected to at least some of the switches.

2. The system of claim 1, wherein the rule generator determines the default routing path from packet forwarding rules stored in each of the switches.

3. The system of claim 1, wherein each of the at least one respective flow monitoring rule at least one of covers a flow space uncovered by any packet forwarding rules stored in the switches and is more specific than any of the packet forwarding rules.

4. The system of claim 1, wherein the probe generator inserts the at least one respective flow monitoring probe into a data plane of the software defined network.

5. The system of claim 4, wherein the software defined network comprises a centralized server, and the at least one respective flow monitoring probe is dispatched from an interface of a centralized server that is connected to the data plane for insertion into a respective one of the switches.

6. The system of claim 1, wherein the at least one respective flow monitoring probe is respectively inserted into respective ones of the switches by encapsulation into a PacketOut OpenFlow message.

7. The system of claim 6, wherein encapsulation of the at least one respective flow monitoring probe for each of the switches is performed by the controller, the controller being connected to a switch control plane and unconnected to a data plane of the software defined network.

8. The system of claim 1, wherein the at least one respective monitoring probe in each of the switches collectively comprises a plurality of monitoring probes for all of the switches, at least one of an arrival distribution, a rate, and a size of the plurality of monitoring probes varying with respect to different ones of the plurality of monitoring probes at different ones of the switches.

9. The system of claim 1, wherein the PacketIn timestamps are comprised in a tuple, the tuple further including a PacketID and a switchID, the PacketID uniquely identifying a given packet, the switchID uniquely identifying a corresponding one of the switches that sent the given packet.

* * * * *